United States Patent
Lian et al.

(10) Patent No.: US 9,294,442 B1
(45) Date of Patent: Mar. 22, 2016

(54) SYSTEM AND METHOD FOR THREAT-DRIVEN SECURITY POLICY CONTROLS

(71) Applicant: vArmour Networks, Inc., Mountain View, CA (US)

(72) Inventors: Jia-Jyi Lian, Saratoga, CA (US); Anthony Paterra, Sunnyvale, CA (US); Marc Woolward, Bude (GB)

(73) Assignee: vArmour Networks, Inc., Mountain View, CA (US)

( * ) Notice: Subject to any disclaimer, the term of this patent is extended or adjusted under 35 U.S.C. 154(b) by 0 days.

(21) Appl. No.: 14/673,679

(22) Filed: Mar. 30, 2015

(51) Int. Cl.
*H04L 29/06* (2006.01)

(52) U.S. Cl.
CPC ........ *H04L 63/0263* (2013.01); *H04L 63/1408* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,253,321 B1 | 6/2001 | Nikander et al. |
| 6,578,076 B1 | 6/2003 | Putzolu |
| 6,765,864 B1 | 7/2004 | Natarajan et al. |
| 6,970,459 B1 | 11/2005 | Meier |
| 6,992,985 B1 | 1/2006 | Das |
| 7,028,179 B2 | 4/2006 | Anderson et al. |
| 7,058,712 B1 | 6/2006 | Vasko et al. |
| 7,062,566 B2 | 6/2006 | Amara et al. |
| 7,397,794 B1 | 7/2008 | Lacroute et al. |
| 7,464,407 B2 | 12/2008 | Nakae et al. |
| 7,620,986 B1 | 11/2009 | Jagannathan et al. |
| 7,742,414 B1 | 6/2010 | Iannaccone et al. |
| 7,774,837 B2 | 8/2010 | McAlister |
| 7,849,495 B1 | 12/2010 | Huang et al. |
| 7,900,240 B2 | 3/2011 | Terzis et al. |
| 8,051,460 B2 | 11/2011 | Lum et al. |
| 8,259,571 B1 | 9/2012 | Raphel et al. |
| 8,274,912 B2 | 9/2012 | Wray et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,490,153 B2 | 7/2013 | Bassett et al. |
| 8,565,118 B2 | 10/2013 | Shukla et al. |

(Continued)

FOREIGN PATENT DOCUMENTS

WO WO2011012165 2/2011

OTHER PUBLICATIONS

Non-Final Office Action, Mailing Date Jul. 1, 2015, U.S. Appl. No. 14/673,640, filed Mar. 30, 2015.

(Continued)

*Primary Examiner* — Brandon Hoffman
(74) *Attorney, Agent, or Firm* — Carr & Ferrell LLP (57) ABSTRACT

Methods, systems, and media for a security system are provided herein. Exemplary methods may include: acquiring a firewall security policy from a policy compiler; receiving network traffic originating from a source machine and directed to a destination machine; analyzing the network traffic using the firewall security policy; forwarding or dropping each of the network traffic according to the security policy; accumulating the network traffic and metadata associated with the network traffic; and initiating an update to the firewall security policy by the policy compiler using at least one of the accumulated network traffic and metadata.

17 Claims, 5 Drawing Sheets

(56) References Cited

U.S. PATENT DOCUMENTS

| | | | |
|---|---|---|---|
| 8,612,744 B2 | 12/2013 | Shieh | |
| 8,726,343 B1 * | 5/2014 | Borzycki et al. | 726/1 |
| 8,798,055 B1 | 8/2014 | An | |
| 8,935,457 B2 | 1/2015 | Feng et al. | |
| 8,990,371 B2 | 3/2015 | Kalyanaraman et al. | |
| 2002/0031103 A1 | 3/2002 | Wiedeman et al. | |
| 2003/0014665 A1 | 1/2003 | Anderson et al. | |
| 2003/0177389 A1 | 9/2003 | Albert et al. | |
| 2004/0062204 A1 | 4/2004 | Bearden et al. | |
| 2004/0095897 A1 | 5/2004 | Vafaei | |
| 2005/0060573 A1 | 3/2005 | D'Souza | |
| 2005/0201343 A1 | 9/2005 | Sivalingham et al. | |
| 2006/0050696 A1 | 3/2006 | Shah et al. | |
| 2006/0137009 A1 | 6/2006 | Chesla | |
| 2007/0019621 A1 | 1/2007 | Perry et al. | |
| 2007/0079308 A1 | 4/2007 | Chiaramonte et al. | |
| 2007/0192863 A1 * | 8/2007 | Kapoor et al. | 726/23 |
| 2007/0271612 A1 | 11/2007 | Fang et al. | |
| 2008/0083011 A1 | 4/2008 | McAlister et al. | |
| 2008/0086772 A1 | 4/2008 | Chesla | |
| 2008/0155239 A1 | 6/2008 | Chowdhury et al. | |
| 2008/0301770 A1 | 12/2008 | Kinder | |
| 2009/0103524 A1 | 4/2009 | Mantripragada et al. | |
| 2009/0182835 A1 | 7/2009 | Aviles et al. | |
| 2009/0268667 A1 | 10/2009 | Gandham et al. | |
| 2010/0043068 A1 | 2/2010 | Varadhan et al. | |
| 2010/0095367 A1 | 4/2010 | Narayanaswamy | |
| 2010/0125900 A1 | 5/2010 | Dennerline et al. | |
| 2010/0189110 A1 | 7/2010 | Kambhampati et al. | |
| 2010/0228962 A1 | 9/2010 | Simon et al. | |
| 2010/0235880 A1 | 9/2010 | Chen et al. | |
| 2010/0333165 A1 | 12/2010 | Basak et al. | |
| 2011/0003580 A1 | 1/2011 | Belrose et al. | |
| 2011/0069710 A1 | 3/2011 | Naven et al. | |
| 2011/0075667 A1 | 3/2011 | Li et al. | |
| 2011/0138384 A1 | 6/2011 | Bozek et al. | |
| 2011/0225624 A1 | 9/2011 | Sawhney et al. | |
| 2011/0249679 A1 | 10/2011 | Lin et al. | |
| 2011/0263238 A1 | 10/2011 | Riley et al. | |
| 2012/0017258 A1 | 1/2012 | Suzuki | |
| 2012/0113989 A1 | 5/2012 | Akiyoshi | |
| 2012/0131685 A1 | 5/2012 | Broch et al. | |
| 2012/0185913 A1 | 7/2012 | Martinez et al. | |
| 2012/0207174 A1 | 8/2012 | Shieh | |
| 2012/0311144 A1 | 12/2012 | Akelbein et al. | |
| 2012/0311575 A1 | 12/2012 | Song | |
| 2013/0086383 A1 | 4/2013 | Galvao de Andrade et al. | |
| 2013/0086399 A1 | 4/2013 | Tychon et al. | |
| 2013/0097692 A1 | 4/2013 | Cooper et al. | |
| 2013/0152187 A1 | 6/2013 | Strebe et al. | |
| 2013/0166720 A1 | 6/2013 | Takashima et al. | |
| 2013/0219384 A1 | 8/2013 | Srinivasan et al. | |
| 2013/0223226 A1 | 8/2013 | Narayanan et al. | |
| 2013/0250956 A1 | 9/2013 | Sun et al. | |
| 2013/0275592 A1 | 10/2013 | Xu et al. | |
| 2013/0276092 A1 | 10/2013 | Sun et al. | |
| 2014/0022894 A1 | 1/2014 | Oikawa et al. | |
| 2014/0283030 A1 | 9/2014 | Moore et al. | |
| 2014/0298469 A1 | 10/2014 | Marion et al. | |
| 2015/0186296 A1 | 7/2015 | Guidry | |

OTHER PUBLICATIONS

Non-Final Office Action, Mailing Date Jul. 16, 2015, U.S. Appl. No. 14/677,827, filed Apr. 2, 2015.
Non-Final Office Action Mailing Date Jul. 31, 2015, U.S. Appl. No. 14/677,755, filed Apr. 2, 2015.
Specification, U.S. Appl. No. 14/673,640, filed Mar. 30, 2015.
Non-Final Office Action, Mailing Date Nov. 19, 2014, U.S. Appl. No. 13/363,082, filed Jan. 31, 2012.
Final Office Action, Mailing Date Apr. 30, 2015, U.S. Appl. No. 13/363,082, filed Jan. 31, 2012.
Notice of Allowance, Mailing Date Aug. 12, 2015, U.S. Appl. No. 13/363,082, filed Jan. 31, 2012.
Non-Final Office Action, Mailing Date Feb. 13, 2013, U.S. Appl. No. 13/363,088, filed Jan. 31, 2012.
Notice of Allowance, Mailing Date Aug. 16, 2013, U.S. Appl. No. 13/363,088, filed Jan. 31, 2012.
Non-Final Office Action, Mailing Date Jan. 23, 2015, U.S. Appl. No. 13/847,881, filed Mar. 20, 2013.
Final Office Action, Mailing Date May 13, 2015, U.S. Appl. No. 13/847,881, filed Mar. 20, 2013.
Non-Final Office Action, Mailing Date May 1, 2015, U.S. Appl. No. 13/860,404, filed Apr. 10, 2014.
Non-Final Office Action, Mailing Date Aug. 12, 2014, U.S. Appl. No. 13/861,220, filed Apr. 11, 2013.
Final Office Action, Mailing Date Jan. 23, 2015, U.S. Appl. No. 13/861,220, filed Apr. 11, 2013.
Non-Final Office Action, Mailing Date May 18, 2015, U.S. Appl. No. 13/861,220, filed Apr. 11, 2013.
Specification, U.S. Appl. No. 14/657,282, filed Mar. 13, 2015.
Specification, U.S. Appl. No. 14/839,649, filed Aug. 28, 2015.
Specification, U.S. Appl. No. 14/839,699, filed Aug. 28, 2015.
Specification, U.S. Appl. No. 14/677,827, filed Apr. 2, 2015.
Specification, U.S. Appl. No. 14/657,210, filed Mar. 13, 2015.

* cited by examiner

SYSTEM AND METHOD FOR THREAT-DRIVEN SECURITY POLICY CONTROLS

FIELD OF THE INVENTION

The present technology is generally directed to cyber security, and more specifically, but not by way of limitation, to systems and methods that provide a security policy control for computer network traffic that is adaptive and driven by declarative policy controls.

SUMMARY

Some embodiments of the present technology include systems which may include: a source machine; a destination machine; a policy compiler; and an enforcement point communicatively coupled via a network to the source machine, the destination machine, and the policy compiler, the enforcement point including a processor and a memory communicatively coupled to the processor, the memory storing instructions executable by the processor to perform a method. The method may include: acquiring a firewall security policy from the policy compiler; receiving network traffic originating from the source machine and directed to the destination machine; analyzing the network traffic using the firewall security policy; forwarding or dropping each of the network traffic according to the security policy; accumulating the network traffic and metadata associated with the network traffic; and initiating an update to the firewall security policy by the policy compiler using at least one of the network traffic and metadata.

Various embodiments of the present technology include methods which may include: acquiring a firewall security policy from a policy compiler; receiving network traffic originating from a source machine and directed to a destination machine; analyzing the network traffic using the firewall security policy; forwarding or dropping each of the network traffic according to the security policy; accumulating the network traffic and metadata associated with the network traffic; and initiating an update to the firewall security policy by the policy compiler using at least one of the accumulated network traffic and metadata.

In some embodiments, the present technology includes a non-transitory computer-readable storage medium having embodied thereon a program, the program being executable by a processor to perform a method. The method may comprise: acquiring a firewall security policy from a policy compiler; receiving network traffic originating from a source machine and directed to a destination machine; analyzing the network traffic using the firewall security policy; forwarding or dropping each of the network traffic according to the security policy; accumulating the network traffic and metadata associated with the network traffic; and initiating an update to the firewall security policy by the policy compiler using at least one of the accumulated network traffic and metadata.

DETAILED DESCRIPTION

Various embodiments of the present technology provide systems and methods for assessing and addressing communications within a data center including virtual machines. The system and method identify insecure communications and additionally stop and/or redirect the communication. The redirected communication is directed to a surveillance communication node, which isolates and prevents a security failure. The surveillance communication node also spoofs the sending communication node by sending communications that appear as if they were sent from the original intended target communication node. In this manner, a security failure is prevented, the damage is limited, and/or information about a bad actor attempting to initiate the security failure is obtained.

The communication nodes discussed herein may be a virtual machine, a server, a cloud-based virtual machine, a host, a client, a workload and/or an electronic enforcement target. Communication packets as discussed herein include data packets or any other electronic communication between communication nodes.

Data centers present unique challenges with respect to security. Various virtual machines (VMs) are used and inhabit the same server. Different virtual machines have different security levels, and/or are associated with different organizations. Preventing security failures due to communications between virtual machines, without requiring all communication to pass through a single chokepoint, which would drastically undermine communication efficiency, is difficult.

A conventional data center rack or server may be part of a cloud system, and may include multiple hypervisors and multiple virtual machines per hypervisor, and a switch (TOR switch, or "Top of Rack" switch). The TOR switch regulates and monitors traffic between virtual machines within the server, and/or connects the server to the outside, for example the Internet, an intranet and/or other parts of the cloud system. A hypervisor is a virtual way of abstracting hardware for providing services to multiple guest operating systems. Two virtual machines on the same server can typically communicate, since a traditional, centralized firewall is unable to operate and prevent this type of interaction without drastically undermining communication efficiency. In contrast, a distributed firewall allows a virtual machine to communicate with adjacent or proximate virtual machines, while maintaining security.

The enforcement point model of the present technology provides a distributed firewall to multiple communication nodes in a cloud environment. In various embodiments, the enforcement point model includes enforcement point engines operating outside of the server housing the virtual machines, and/or includes additional elements, for instance enforcement point interceptors, in the switch of a server. The redirection by an enforcement point is implemented in various ways, for example, by tunneling over a fabric of a distributed firewall, copying and sending a copy to a honeypot, sending TCP resets to prevent future communications, and/or by snooping IP addresses, for example. Other possible actions by an enforcement point or software module implementing an enforcement point model of a distributed firewall are also possible.

One challenge for cloud systems is illustrated by security arrangements required by credit card companies. These protocols are referred to as PCI (Payment Card Industry), and are a use case in retail compliance for the present technology. PCI machines (virtual or physical), require certain security protocols to be enforced in order to pass muster with credit card companies. For example, systems that store, process and forward credit card data (PCI machines) should not communicate with systems that do not perform these functions (non-PCI machines). Similarly, a use case in a financial industry setting for the present technology may limit communication between production and pre-production machines.

Figure 1:
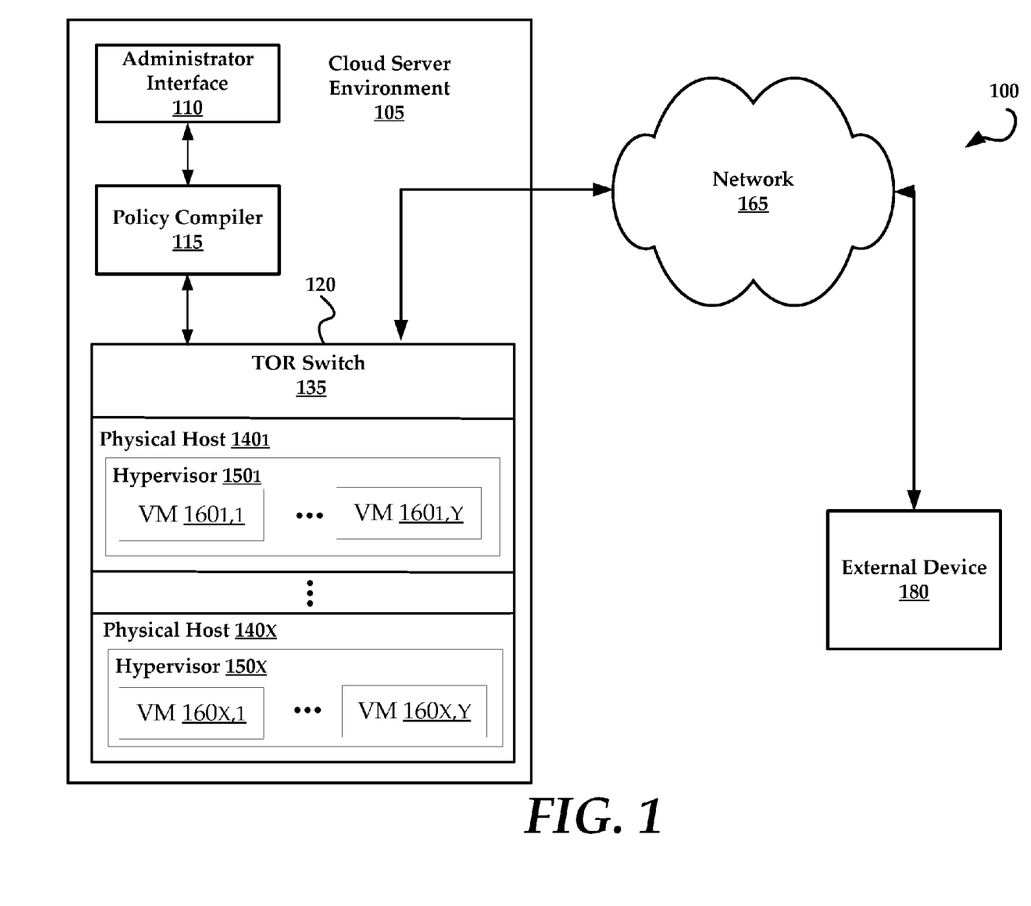
FIG. 1 is a simplified block diagram of a system.

FIG. 1 is a block diagram illustrating system 100 according to an example embodiment. System 100 includes cloud server environment 105, which may be a public cloud, private cloud, an intranet, or any other appropriate network. Cloud server environment 105 includes an administrator interface 110 which enables an Information Technology (IT) or security administrator to input security policies. Administrator interface 110 includes a user interface and/or an application programming interface (API). These policies include, for example, prohibitions against high-value assets from communicating with high-risk assets, PCI compliant workloads from communicating with non-PCI compliant workloads, or production machines from communicating with test/development machines. These policies may also include failover policies, or any other appropriate prohibition, limitation or policy.

The administrator interface 110 communicates bilaterally with policy compiler 115, which converts the abstract policies into computer executable instructions. Policy compiler 115 communicates the computer executable instructions to server 120. Cloud server environment 105 includes many servers, with a similar or different structure from each other, and with a similar or different structure from server 120. Server 120 is coupled to some or all of the other servers in cloud server environment 105. Server 120 is also coupled to network 165, which may be the internet, an intranet, or any other appropriate network. Network 165 is coupled to all the other devices on the internet, represented here as external device 180. External device 180 includes the access point to network 165 for a bad actor or hacker interested in inducing a security failure of an entity associated with cloud server environment 105.

Figure 2:
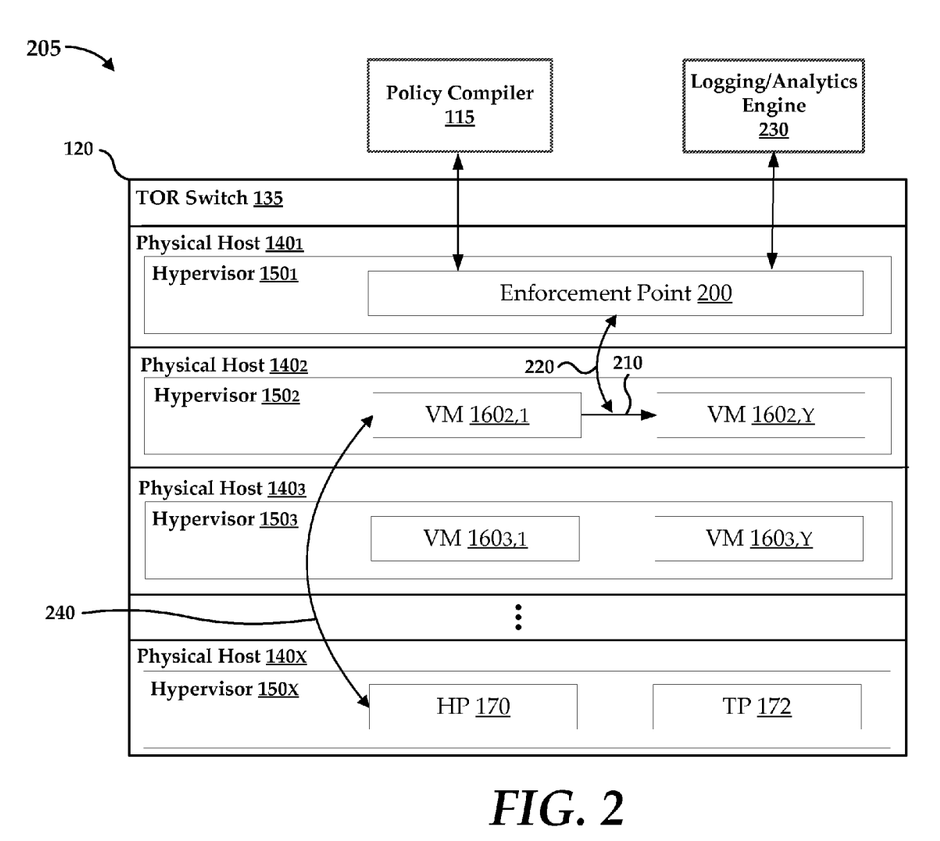
FIG. 2 is a simplified block diagram of a device.

Server 120 includes TOR switch (Top of Rack switch) 135, which operates to control communications into and out of server 120. Server 120 includes at least one or more physical hosts $140_1$-$140_X$. Each of the physical hosts $140_1$-$140_X$ includes hypervisors $150_1$-$150_X$, respectively. Each of the hypervisors $150_1$-$150_X$ includes one or more virtual machines (VMs) $160_{1,1}$-$160_{1,Y}$ to $160_{X,1}$-$160_{X,Y}$, respectively. Alternatively or additionally, different virtual machine systems may be used, for example containers. Additionally, server 120 includes honeypot (HP) 170 and/or tarpit (TP) 172 (FIG. 2). Honeypot 170 operates to receive communications deemed insecure, and to additionally draw out additional communications from a bad actor by spoofing or appearing to be the original target of a malevolent communication. Tarpit 172 operates to receive communications deemed insecure for logging and analytic purposes. Although honeypot 170 and tarpit 172 are depicted in hypervisor $150_X$ of physical host $140_X$, honeypot 170 and tarpit 172 may be in any hypervisor of any physical host, in the same server (rack), different server (rack), different data center, etc. The operation of server 120 and its constituents is discussed in greater detail with respect FIG. 2.

FIG. 2 is a block diagram illustrating system 205 including server 120 and policy compiler 115 according to an example embodiment. Policy compiler 115 communicates compiled declarative security policies to enforcement point 200 in TOR switch 135 of server 120. Policy compiler 115 is described further in related United States Patent Application "Conditional Declarative Policies" (application Ser. No. 14/673,640 filed Mar. 30, 2015), which is hereby incorporated by reference in its entirety. Although enforcement point 200 is depicted in hypervisor $150_1$ of physical host $140_1$, enforcement point 200 may be in any hypervisor of any physical host, in the same server (rack), different server (rack), different data center, etc. Although one enforcement point 200 is shown in FIG. 2, two or more of enforcement point 200 may be provisioned in server 120. Enforcement point 200 monitors traffic initiated and/or received by virtual machines in server 120, whether directed to virtual machines in server 120, directed to other virtual machines in the cloud environment, or directed outside the cloud environment. In some embodiments, enforcement point 200 monitors traffic initiated and/or received by particular virtual machines in server 120.

Illustrated in FIG. 2 is communication 210 initiated by virtual machine $160_{2,1}$ and directed to virtual machine $160_{2,Y}$ of server 120. Enforcement point 200 conducts examination 220 prior to forwarding communication 210 to virtual machine $160_{2,Y}$. If communication 210 does not violate any policies, for example, by not exceeding a trigger threshold of a risk score, or because communication 210 does not violate a conditional declarative security policy, enforcement point 200 allows communication 210 to proceed to virtual machine $160_{2,Y}$. In this case, enforcement point 200 may retain information related to communication 210, including for example metadata and/or the content of communication 210, and may log, store or communicate this information to logging/analytics engine 230.

However, if communication 210 does violate one or more policies, for example, by exceeding a trigger threshold of a risk score, or by violating a conditional declarative security policy, enforcement point 200 prevents or denies communication 210 from proceeding to virtual machine $160_{2,Y}$. Instead, in this case, enforcement point 200 redirects communication 210, as redirected communication 240, to honeypot 170. Honeypot 170 operates to receive communications deemed insecure, and to additionally draw out additional communications from a bad actor by spoofing or appearing to be the original target of a malevolent communication. For example, redirected communication 240 is bi-directional, and honeypot 170 responds to the communication from virtual machine $160_{2,1}$, and includes communication identifiers associated with virtual machine $160_{2,Y}$. In this manner, honeypot 170 spoofs or imitates virtual machine $160_{2,Y}$, and thereby induces additional communications from virtual machine $160_{2,1}$. As a result of this spoofing, additional information about any bad actor, including identity, techniques, and any identified weaknesses in server 120 or the cloud environment, is obtained.

Additionally or alternatively, enforcement point 200 redirects communication 210, as a redirected communication, to tarpit 172. Tarpit 172 operates to receive communications deemed insecure, and to maintain the insecure communications in a quarantined state, thereby preventing contamination of any other virtual machines on server 120 or within the cloud environment. Tarpit 172 also provides a source of information for logging and analytics of insecure communications.

Additionally, enforcement point 200 retains information related to redirected communication 240, including for example metadata and/or the content of redirected communication 240, and logs, stores or communicates this information to logging/analytics engine 230.

Additionally or alternatively, a virtual machine (e.g., VM $160_{2,1}$) may be determined to be compromised and become a high risk virtual machine. The security policy can be updated to reflect the change to the virtual machine (e.g., VM $160_{2,1}$) and an updated (e.g., re-compiled) firewall rule set received by enforcement point 200 from policy compiler 115. The updated firewall rule set can direct enforcement point 200 to block communications/traffic and/or provide additional monitoring as described above.

In embodiments of the present technology, a security policy is implemented as a conditional declarative policy. The conditions of a declarative policy are functions of compliance, security and tenants within the data center. Compliance for example, means that PCI machines do not communicate with non-PCI machines, and vice versa, which is a mandate of the PCI protocol. Geo-location policies may also be implemented by a declarative policy. For example, sensitive data is not allowed outside of Switzerland. Similarly, a declarative policy may limit access to secret workloads to only U.S. citizens, pursuant to a mandate of the Federal Government.

Additionally or alternatively, security policies are not government mandated, but are best practices for security policy. For example, a security policy implemented by a declarative security policy prevents high-risk machines (e.g., a test development machine) from communicating with high-value assets. High-risk machines may be determined based on a risk scoring system, similar to a credit score, which evaluates several attributes to determine a risk score. Similarly, if a machine (virtual or physical) is compromised, for example, by a cyberattack, the communication channels leading to and away from the machine are limited. In this way, hackers gaining access via a weak link machine are prevented from then moving within the network to higher value machines.

Tenant policies allow application developers to access particular services. For example, to create a mail service, a developer may require access to a Domain Name System (DNS), a Simple Mail Transfer Protocol (SMTP), and/or Lightweight Directory Access Protocol (LDAP) servers. Providing this access is an example of a tenant policy.

The declarative policy, whether compliance, security and/or tenants, is dynamically compiled on a regular basis in order to maintain the policy updates for a data center. The declarative rule intrinsic to the declarative policy is compiled, then implemented, and the compilation is dynamic due to revisions of the declarative rules.

Examples of security levels that are enforced by a declarative security policy implemented on a distributed firewall include "always-must-abide-by" rules, which are enforced initially by a firewall administrator responsible for implementing security policy. Always-must-abide-by rules are absolute, and other users must request a declaration from an IT or security administrator to access a workload protected by an always-must-abide-by rule preventing communication.

An example of a lower security level that is enforced is a "usually-must-abide-by" rule, which provides a lower order of protection. An IT manager may implement a conditional declarative policy via a graphical user interface (GUI), via a command line interface, or via a REST-based API, where REST stands for "Representational State Transfer".

These systems input policies into the present technology, forming a declarative policy table. The declarative policy table is dynamically recompiled into a set of compiled rules, which are pushed down to the distributed firewall for enforcement. A list of rules are pushed to elements of the distributed firewall, and the rules may be, for example, prohibitions against particular machines (IP addresses) communicating with each other. An example policy is that PCI compliant workloads cannot communicate with non-PCI compliant workloads.

In exemplary embodiments of the present technology, the declarative policies are implemented in a variety of ways. Blocking communication is the strongest possible action, but more granularity in response is also possible. For example, the declarative policy is that high-risk workloads cannot communicate with high-value workloads, and virtual machine 1 (VM1) is identified as high-risk by the security policy, while virtual machine 2 (VM2) is identified as high-value. If VM1 is compromised, the system, instead of just blocking communications from VM1, may access a list of possible actions to be taken. For example, the system redirect the communication to a honeypot, tarpit, or additionally or alternatively, to a synthetic attack surface (collectively referred to herein as surveillance nodes). In contrast, a traditional firewall is a binary system, either blocking or allowing communications. The redirect may cause a packet to be sent to quarantine by the distributed firewall. A honeypot can communicate with a source of the communication, and can emulate the true target, thereby obtaining additional information about the compromised virtual machine and/or its operator.

Various threat technique responses are possible using the present technology. The initial aspect is detecting and/or identifying a communication as suspicious, which may be due to a risk score rising above a first trigger level, in which the first trigger level may not justify blocking the communication. The first trigger may cause additional inspection, or another intermediate response. If a second or higher trigger point is reached, redirection to a honeypot and/or other another investigation tool may be implemented. As described in relation to FIGS. 3 and 4, an adjustment to the risk score and/or an adjustment to the security policy may be performed. According to some embodiments, dynamically calculating a risk score advantageously informs firewall policy. Additionally or alternatively, subsequent communications may be blocked or allowed.

Figure 3:
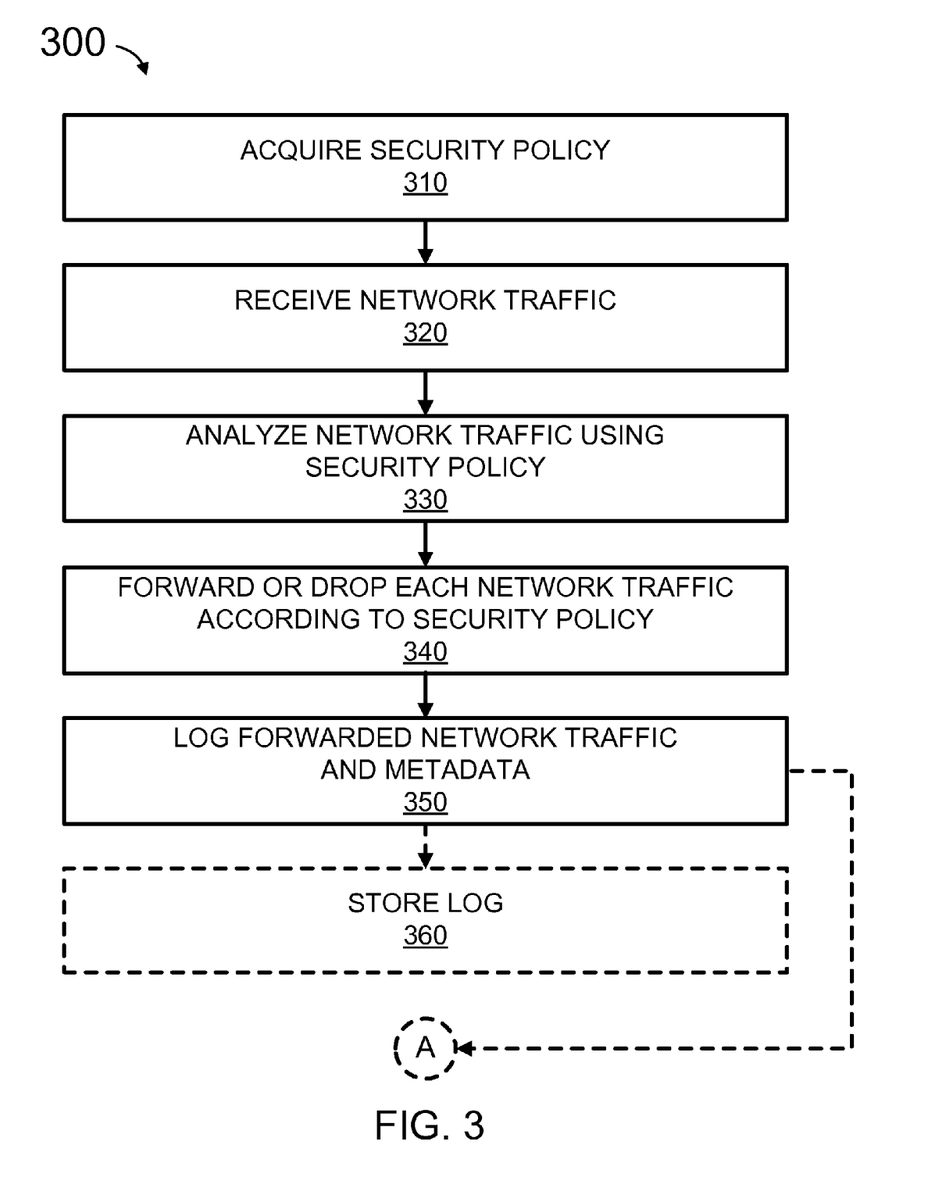
FIG. 3 is a flow diagram illustrating an example method.

FIG. 3 shows a method 300 for logging network traffic and metadata associated with the traffic according to some embodiments. In various embodiments, network traffic is data (encapsulated in network packets) in a (computer/data) network. At step 310, a compiled security policy is acquired. For example, a compiled security policy is acquired from policy compiler 115 (FIG. 1). At step 320, network traffic is received. For example, the communications packets are sent from VM $160_{2,1}$ to VM $160_{2,Y}$ and are examined by enforcement point 200 (FIG. 2).

At step 330, the network traffic is analyzed using the security policy. For example, the network traffic is analyzed by enforcement point 200 and enforcement point 200 determines the security policy is violated (e.g., the communications are not allowed or permitted by the policy) or not violated (e.g., the communications are allowed or permitted by the policy). At step 340, the network traffic is forwarded or dropped. By way of non-limiting example, the network traffic is directed to its intended recipient and/or the network traffic is redirected to honeypot 170. By way of further non-limiting example, the network traffic is dropped (e.g., not allowed to proceed to its intended recipient).

At step 350, the forwarded traffic and metadata associated with the traffic are logged. For example, at least one of the source IP address, source port, destination IP address, destination port, (application) protocol, action prescribed by the security policy, action taken by the enforcement point 200, metadata and the like is logged or accumulated. In some embodiments, metadata is associated with a (application) protocol associated with each of the packet and subsequent related packets. Protocols associated with the packets include at least one of: Dynamic Host Configuration Protocol (DHCP), Domain Name System (DNS), File Transfer Protocol (FTP), Hypertext Transfer Protocol (HTTP), Internet Message Access Protocol (IMAP), Post Office Protocol (POP), Secure Shell (SSH), Secure Sockets Layer (SSL), Transport Layer Security (TLS), and the like. Metadata associated with DNS can be a requested host name. Metadata associated with HTTP can be a requested web page and/or an agent (e.g., particular web browser and web browser version originating the packet). In some embodiments, the logging includes packet capture (PCAP). In some embodiments, method 400 (FIG. 4) is performed substantially in real time. By way of non-limiting example, after step 350, method 300 optionally proceeds to step 420 of method 400 in FIG. 4.

Figure 4:
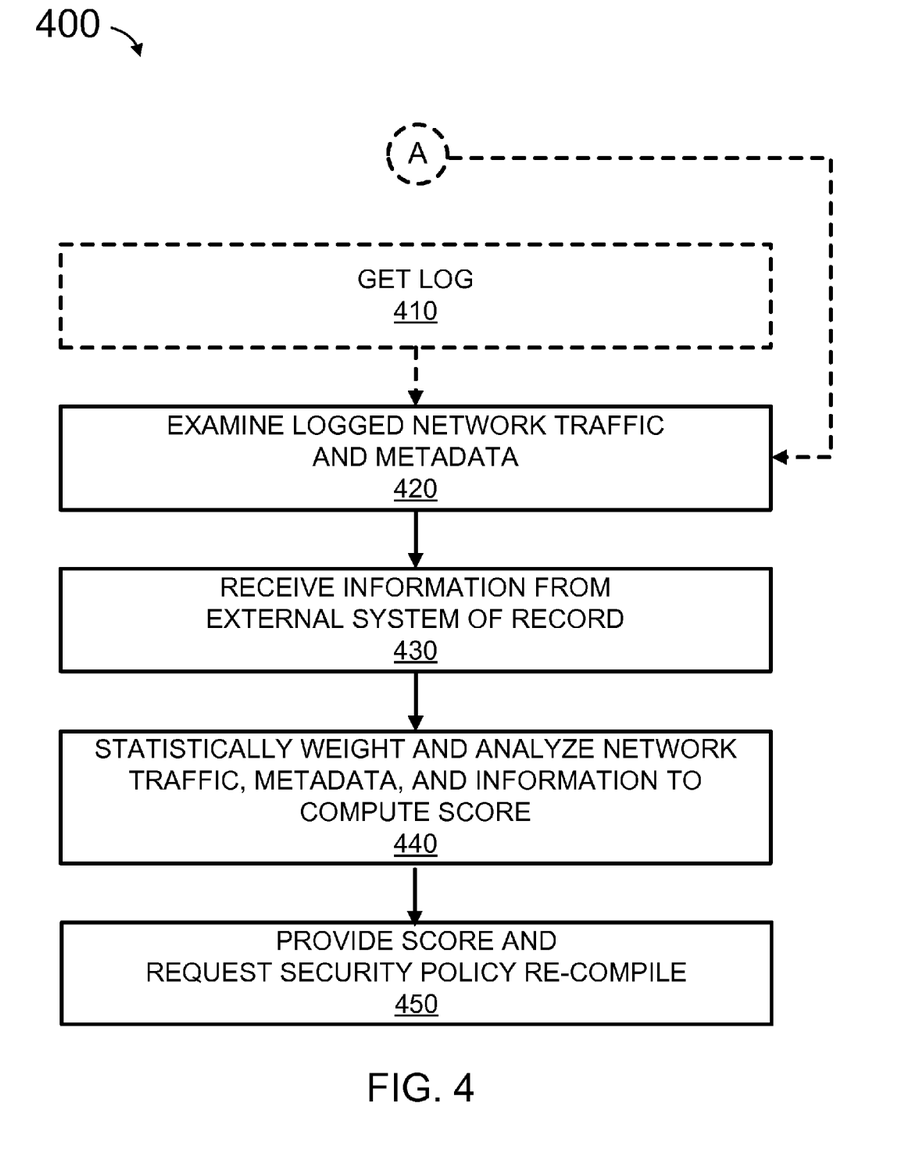
FIG. 4 is a flow diagram showing a further example.

In various embodiments, method 400 is performed at least partially not in real time. By way of further non-limiting example, at step 360, the logged or accumulated network traffic and associated metadata are optionally stored in a data store and method 300 optionally proceeds to step 410 of method 400.

FIG. 4 depicts a flow diagram for a method 400 for dynamically calculating a risk score using at least accumulated data associated with a (potential) threat to inform firewall policy. Optionally at step 410, a log is received. For example, a log stored at step 360 (FIG. 3) is retrieved from a data store. Optionally, method 300 continues from step 350 (FIG. 3) at step 420. For example, the traffic and associated metadata accumulated at step 350 is examined at step 420.

At step 420, the traffic and associated metadata are examined. In some embodiments, communications/operations/behaviors are identified from the traffic and associated metadata. For example, a VM typically using SSH suddenly using telnet is identified. To provide another example, a number of FTP connections to a VM exceeds a pre-defined number within a certain amount of time. These suspicious VMs will be identified and sent to step 430.

At step 430, information associated with the traffic is received from an external system of record. By way of non-limiting example, external systems of record are at least one of: Microsoft Active Directory (AD), ServiceNow, VMware vCenter, Apache CloudStack, OpenStack, and the like. In some embodiments, a system for managing VMs (e.g., VMware vCenter, Apache CloudStack, OpenStack, and the like) provides information about the suspicious VM. The information provides context about suspicious VMs. For example, the external system of record includes facilities for (user-defined) categorization and tagging which provide context to the suspicious activity (e.g., potential threat). By way of further non-limiting example, the categories and tags identify a VM as (a part of) a QA system or test development system, as opposed to a production system, where a QA or test development system should not access sensitive information. By way of additional non-limiting example, the categories and tags identify two machines as suddenly being in a backup pairing, where such a pairing did not exist before.

At step 440, the network traffic, associated metadata, and information from the external system of record are weighted. For example, a higher trust or confidence associated with the tags and categories of the external system of record results in greater relative consideration of the information of the external system of record, to other factors (e.g., accumulated network traffic and associated metadata). For example, a lower trust or confidence associated with the tags and categories of the external system of record results in less relative consideration of the information of the external system of record, to other factors (e.g., accumulated network traffic and associated metadata).

Also at step 440, the network traffic, associated metadata, and information from the external system of record are statistically analyzed using the weightings to produce an updated risk score. Risk score can be protocol specific, e.g. FTP protocol has a high score because it can transfer out a large amount of files and critical information. Telnet protocol has a lower score because of its interactive nature. The risk score may be any (predetermined and/or decimal) numeric range (understood by policy compiler 115). By way of non-limiting example, the risk score and be in the range of –10 to +10, 0 to 100, 0 to 1000, and the like.

At step 450, a security policy re-compile is initiated (e.g., requested), including providing the updated risk score. For example, a security policy re-compile is requested from policy compiler 115. In response to re-compiling the security policy using at least the updated risk score, for example, policy compiler 115 disseminates a resulting updated security policy to enforcement point 200.

Figure 5:
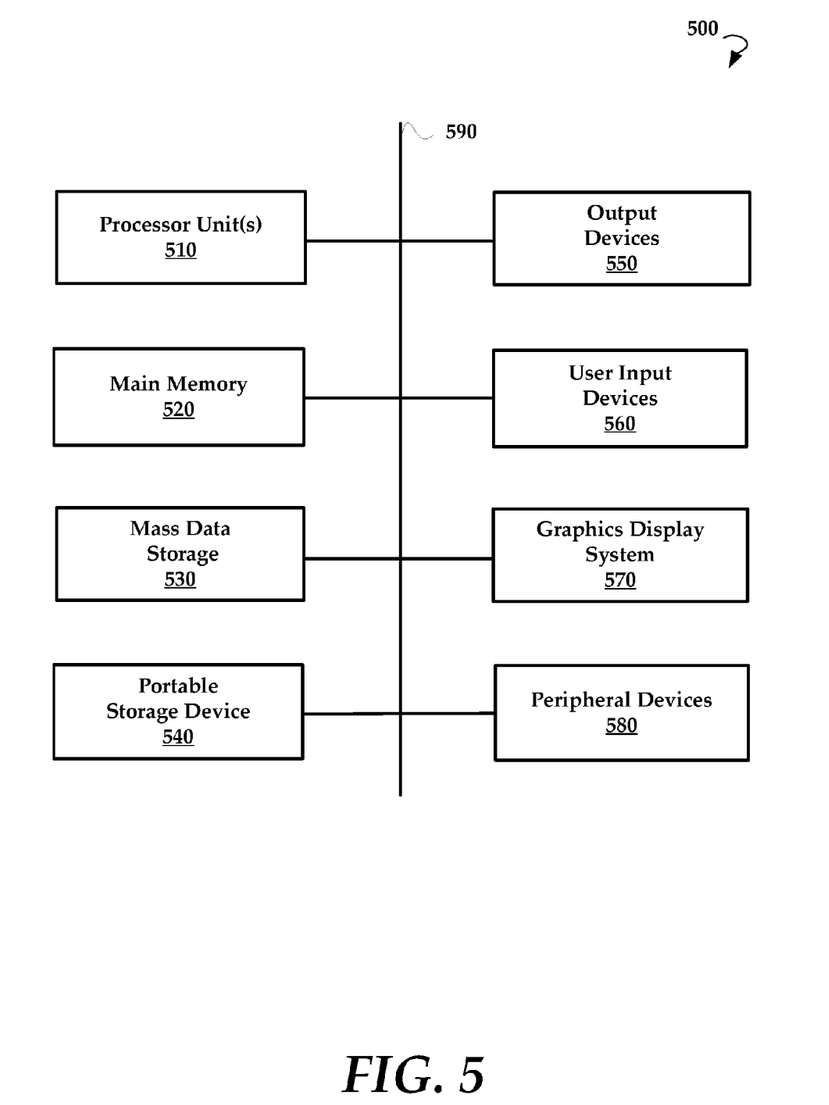
FIG. 5 is a simplified block diagram of a computer system.

FIG. 5 illustrates an exemplary computer system 500 that may be used to implement some embodiments of the present disclosure. The computer system 500 of FIG. 5 may be implemented in the contexts of the likes of computing systems, networks, servers, or combinations thereof. The computer system 500 of FIG. 5 includes one or more processor unit(s) 510 and main memory 520. Main memory 520 stores, in part, instructions and data for execution by processor unit(s) 510. Main memory 520 stores the executable code when in operation, in this example. The computer system 500 of FIG. 5 further includes a mass data storage 530, portable storage device 540, output devices 550, user input devices 560, a graphics display system 570, and peripheral devices 580.

The components shown in FIG. 5 are depicted as being connected via a single bus 590. The components may be connected through one or more data transport means. Processor unit(s) 510 and main memory 520 are connected via a local microprocessor bus, and the mass data storage 530, peripheral devices 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 includes a liquid crystal display (LCD) or other suitable display device. Graphics display system 570 is configurable to receive textual and graphical information and processes the information for output to the display device.

Peripheral devices 580 may include any type of computer support device that adds additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A system comprising:
a source machine;
a destination machine;
a policy compiler; and
an enforcement point communicatively coupled via a network to the source machine, the destination machine, and the policy compiler, the enforcement point including a processor and a memory communicatively coupled to the processor, the memory storing instructions executable by the processor to perform a method including:
acquiring a firewall security policy from the policy compiler;
receiving network traffic originating from the source machine and directed to the destination machine;
analyzing the network traffic using the firewall security policy;
forwarding or dropping the network traffic according to the firewall security policy;
accumulating the network traffic and metadata associated with the network traffic; and
initiating an update to the firewall security policy by the policy compiler using at least one of the network traffic and the metadata, the initiating the update to the firewall security policy by the policy compiler comprising:
receiving information associated with the source machine and the destination machine from an external system of record;
weighting one or more of a redirected network packet, further network traffic, the metadata, and the received information;
statistically analyzing the weighted one or more of the redirected network packet, the further network traffic, the metadata, and the received information to calculate an updated risk score; and
providing the updated risk score to the policy compiler, such that the policy compiler produces an updated security policy.

2. The system of claim 1 wherein the method further comprises:
receiving the updated security policy from the policy compiler.

3. The system of claim 2 wherein the method further comprises:
applying the updated security policy to another packet.

4. The system of claim 1 wherein the policy compiler produces the updated security policy using at least a conditional declarative policy, the metadata, and the updated risk score.

5. The system of claim 1 further comprising:
a surveillance node communicatively coupled to the source machine via the network, wherein redirecting is to the surveillance node.

6. The system of claim 5 wherein the source machine communicates with the surveillance node as if the surveillance node were the destination machine.

7. The system of claim 6 wherein the surveillance node is a honeypot.

8. The system of claim 1 wherein determining the packet violates the firewall security policy uses at least one of an address associated with the source machine, a port associated with the source machine, an address associated with the destination machine, a port associated with the destination machine, and a protocol associated with the packet.

9. The system of claim 1 wherein the source machine is at least one of a first physical host and a first virtual machine and wherein the destination machine is at least one of a second physical host and a second virtual machine.

10. A method for operating an enforcement point comprising:
acquiring a firewall security policy from a policy compiler;
receiving network traffic originating from a source machine and directed to a destination machine;
analyzing the network traffic using the firewall security policy;
forwarding or dropping each of the network traffic according to the firewall security policy;
accumulating the network traffic and metadata associated with the network traffic; and
initiating an update to the firewall security policy by the policy compiler using at least one of the network traffic and the metadata, the initiating the update to the firewall security policy by the policy compiler comprising:

receiving information associated with the source machine and the destination machine from an external system of record;

weighting one or more of a redirected network packet, further network traffic, the metadata, and the received information;

statistically analyzing the weighted one or more of the redirected network packet, the further network traffic, the metadata, and the received information to calculate an updated risk score;

providing the updated risk score to the policy compiler, such that the policy compiler produces an updated security policy;

receiving the updated security policy from the policy compiler; and applying the updated security policy to another packet.

11. The method of claim 10 wherein the policy compiler produces the updated security policy using at least a conditional declarative policy, the metadata, and the updated risk score.

12. The method of claim 10 wherein the redirecting is to a surveillance node, the surveillance node being communicatively coupled to the source machine via a network.

13. The method of claim 12 wherein the source machine communicates with the surveillance node as if the surveillance node were the destination machine.

14. The method of claim 13 wherein the surveillance node is a honeypot.

15. The method of claim 10 wherein determining the packet violates the firewall security policy uses at least one of an address associated with the source machine, a port associated with the source machine, an address associated with the destination machine, a port associated with the destination machine, and a protocol associated with the packet.

16. The method of claim 10 wherein the source machine is at least one of a first physical host and a first virtual machine and wherein the destination machine is at least one of a second physical host and a second virtual machine.

17. A non-transitory computer-readable storage medium having embodied thereon a program, the program being executable by a processor to perform a method, the method comprising:

acquiring a firewall security policy from a policy compiler;

receiving network traffic originating from a source machine and directed to a destination machine;

analyzing the network traffic using the firewall security policy;

forwarding or dropping the network traffic according to the firewall security policy;

accumulating the network traffic and metadata associated with the network traffic; and initiating an update to the firewall security policy by the policy compiler using at least one of the network traffic and the metadata, the initiating the update to the firewall security policy by the policy compiler comprising:

receiving information associated with the source machine and the destination machine from an external system of record;

weighting one or more of a redirected network packet, further network traffic, the metadata, and the received information;

statistically analyzing the weighted one or more of the redirected network packet, further network traffic, the metadata, and the received information to calculate an updated risk score;

providing the updated risk score to the policy compiler, such that the policy compiler produces an updated security policy;

receiving the updated security policy from the policy compiler; and applying the updated security policy to another packet.

* * * * *